United States Patent [19]

Cholod

[11] Patent Number: 4,547,563

[45] Date of Patent: Oct. 15, 1985

[54] COPOLYESTER OF POLYETHYLENE TEREPHTHALATE AND BIS (4-BETA HYDROXY ETHOXY PHENYL) SULFONE

[75] Inventor: Michael S. Cholod, Cornwells Heights, Pa.

[73] Assignee: Rohm and Haas Company, Philadelphia, Pa.

[21] Appl. No.: 558,083

[22] Filed: Dec. 5, 1983

Related U.S. Application Data

[63] Continuation of Ser. No. 466,246, Feb. 14, 1983, abandoned.

[51] Int. Cl.$^4$ .................... C08G 63/66; C08G 63/68
[52] U.S. Cl. ............................ 528/173; 428/480
[58] Field of Search .................... 528/173; 428/480

[56] References Cited

U.S. PATENT DOCUMENTS

| | | | |
|---|---|---|---|
| 2,973,339 | 2/1961 | Muenster et al. | 528/173 |
| 4,145,517 | 3/1979 | Go | 528/173 |
| 4,163,100 | 7/1979 | Bier et al. | 528/173 |
| 4,188,357 | 2/1980 | Go | 528/173 |
| 4,307,060 | 12/1981 | Go | 528/173 |
| 4,330,661 | 5/1982 | Go | 528/173 |
| 4,384,106 | 5/1983 | Go et al. | 528/173 |

*Primary Examiner*—Lester L. Lee
*Attorney, Agent, or Firm*—Marc S. Adler

[57] ABSTRACT

A copolyester of polyethylene terephthalate and bis (4-beta hydroxy ethoxy phenyl) sulfone and a process for its preparation are provided. The copolyester has an intrinsic viscosity, glass transition temperature, and impact strength comparable to polyethylene terephthalate homopolymer but exhibits an increased crystallization time and is capable of being molded into clear articles. The process for preparing the copolyester comprises the steps of forming a polyethylene terephthalate prepolymer and polycondensing the prepolymer, preferably in the solid phase, with from about 2 to about 5 mole percent of bis (4-beta hydroxy ethoxy phenyl) sulfone in the presence of a suitable metallic catalyst system.

9 Claims, No Drawings

COPOLYESTER OF POLYETHYLENE TEREPHTHALATE AND BIS (4-BETA HYDROXY ETHOXY PHENYL) SULFONE

This is a continuation of application Ser. No. 466,246 filed Feb. 14, 1983, now abandoned.

BACKGROUND OF THE INVENTION

This invention is related to my copending patent application Ser. No. 436,228 filed on Oct. 25, 1982.

This invention relates to a copolyester of polyethylene terephthalate and a process for preparing the copolyester. The copolyester is useful in forming films and clear molded articles. More particularly, this invention relates to a copolyester of polyethylene terephthalate and bis (4-beta hydroxy ethoxy phenyl) sulfone (hereafter referred to as BSE) having an increased crystallization time which provides the user of such copolyesters with more processing time to manufacture thicker films or molded articles, thereby avoiding premature crystallization and its attendant disadvantages.

Polyethylene terephthalate polymers can be either crystalline or non-crystalline solids. Crystalline polyethylene terephthalate (PET) is white and opaque, while the non-crystalline form is generally clear or transparent. When manufacturing a film the melted PET polymer may be extruded onto a casting roll, and if a molded article is to be manufactured, the PET polymer may be injected into a mold. Regardless of whether a film or molded article is being manufactured, the manufacturer desires to obtain the finished article substantially composed of transparent or clear PET to avoid the commercial disadvantage associated with a white, opaque film or article. It is known that when PET is heated to a semi-molten state, above its crystalline melting point, PET is amorphous. Unless the polymer is quickly cooled, the film or molded article will tend to crystallize and the resulting product will have a color or opacity which is commercially unacceptable. The manufacturer is well aware of the fact that, when processing PET, he has only a limited amount of time, generally only about one minute, to solidify the film or molded article in the amorphous state before significant crystallization sets in.

DESCRIPTION OF THE PRIOR ART

PET polymers are conventionally produced in two steps. In the first step a prepolymer is formed. This is accomplished commercially in either of two ways. The prepolymer may be formed by the ester interchange reaction of ethylene glycol and dimethyl terephthalate or by the direct esterification reaction of ethylene glycol and terephthalic acid. Once the prepolymer is formed it is converted, in a second step, by a polycondensation reaction to a higher molecular weight polymer.

Since PET homopolymers crystallize too rapidly for molding into clear articles and result in opaque or colored products, copolymers of PET have been proposed. These copolymers have been formed using certain glycols instead of, or in addition to, ethylene glycol, or by using certain co-acids or their corresponding esters, in the prepolymer formation step. It has been found, however, that most of the common co-glycols and co-acids impart a lower glass transition temperature to the resulting polymer and reduce the resistance of the polymer to heat-induced embrittlement.

Attempts have been made to produce slow crystallizing PET copolymer by incorporating 5-20% of a coglycol or coacid. It has been found that, in order to increase the crystallization time enough to obtain a clear 0.2 inch thick molded part, a level of coglycol or co-acid must be used which causes the resulting PET copolymer to embrittle when held for short periods of time at temperatures below their glass transition temperature. If the level of the conventional co-acid or coglycol is reduced to the point where heat-induced embrittlement does not occur, then 0.2 inch thick parts molded from the resins will be very hazy or white (opaque) due to rapid crystallization.

Others in the field have unsuccessfully attempted to overcome the problems of rapid crystallization time, thermal stability, and color by various modifications to the prepolymer formation step, the polycondensation reaction step, and the catalysts utilized in the process.

Fiber forming terephthalate copolyesters having better water absorption and dyeability and a slightly decreased tendency toward crystallization are disclosed in U.S. Pat. No. 2,973,339 to Muenster et al. This patent discloses the use of certain co-glycols containing up to 30 mole percent, and preferably 5 to 20 mole percent, of a glycol containing one or two benzene nucleii, for example, para-para'-di-(beta -hydroxy ethoxy) diphenyl sulfone (BSE) in the presence of conventional esterification catalysts such as zinc borate, zinc benzoate, zinc oxide, magnesium stearate, barium oxide or lead oxide in the prepolymer formation step. This patent does not, however, teach or suggest a method for producing clear molded articles having improved crystallization time as compared to terephthalate homopolymers, or that parts molded from such a copolyester would be expected to have an improved resistance to heat-induced embrittlement.

U.S. Pat. No. 4,066,624 to Kawase et al. teaches that stability and transparency can be improved while retarding crystallization speed by the ester interchange reaction of a naphthalene dicarboxylic acid (component A), a diol containing an aromatic group and compound, such as a 4,4'-bis(omega-hydroxy alkoxy) diphenyl sulfone (BSE) (component B), and an aliphatic or alicyclic diol (component C). Component B contains at least 50 mole percent BSE or derivatives thereof. The proportion of component B may range from 5 to 95 mole percent of component A. The BSE was found to retard the crystallization of polyesters and to give polyesters good transparency and excellent thermal stability when combined with the other components. When BSE or its derivatives is used alone, without the aliphatic or alicyclic diol, the Kawase patent teaches that polyesters of sufficiently high degrees of polymerization cannot be prepared. The BSE (coglycol) was found to retard crystallization of naphthalene polyesters, however; it was necessary to use the BSE co-glycol jointly with a diol to prepare a high molecular weight polyester.

U.S. Pat. No. 4,188,357 to Go recognized that the glass transition temperature (Tg) of PET produced by direct esterification of terephthalic acid and ethylene glycol could be improved by adding a co-glycol, bis (4-beta-hydroxy ethoxy phenyl) sulfone (BSE) and a crosslinking agent, such as a trimellitic acid or its anhydride or lower alkyl ($C_1$-$C_4$) ester. The improvement in the melt strength of the resulting polymer was the result of crosslinking. The BSE co-glycol helped to lower the melting point and raise the glass transition temperature of the polymer and allowed for lower extrusion and blowing temperatures without premature crystallization. This patent is silent, however, regarding the degree of any increase in crystallization time achieved using BSE (coglycol) over that which would typically be expected by the addition of any coglycol. The addition of BSE was directed primarily towards improving the glass transition temperature of the PET and the invention resides in the addition of the trimellitic crosslinking agent to form molded articles.

U.S. Pat. No. 4,307,060, also to Go, discloses new copolyesters particularly useful as extrusion-blow molded (hollow) articles produced by the direct esterification reaction of terephthalic acid, ethylene glycol, bis (4-beta-hydroxy ethoxy phenyl) sulfone (BSE) coglycol and a trifunctional crosslinking agent. The patent teaches using BSE at a concentration of from 2–25 mole percent on the amount of the terephthalic acid.

Other publications disclose the use of sulfonyl diphenol for preparing polyester fibers having higher shrinking and higher compatibility (Shima et al, Japanese Pat. Nos. 71,38614 and 71,34929). These publications do not teach or suggest the addition of BSE to retard crystallization time. Ishigaki, Japanese Pat. No. 73,71496, discloses the use of polyols and dihydroxy compounds to prepare heat and chemically resistant polyesters for coatings. The Ishigaki reference teaches the addition of sulfonyl diphenol after the polyethylene terephthalate is formed in a post reaction step to improve the utility of the polyester for coatings. The coatings, however, have a commercially unacceptable yellow color. Crystallization time is not typically important in coating applications. Accordingly, these publications do not teach or suggest increasing the crystallization time of polyethylene terephthalate copolyesters which are capable of being molded into clear articles by the addition of BSE.

Other attempts have been made to improve the process for producing PET polymers having good color properties. U.S. Pat. No. 4,356,299, incorporated herein by reference, discusses the prior art attempts at providing improved polycondensation catalyst systems and discloses and claims an improved catalyst system which reduces the polycondensation reaction time. This catalyst comprises from about 2 to about 18 parts per million, based on the polymer product, of a catalyst metal in the form of an alkyl titanate and from about 40 to about 300 parts per million of catalyst metal in the form of an antimony compound.

Thus, the art has recognized the problems of producing polyethylene terephthalate polymers or copolymers having the desired properties of increased crystallization time and clarity.

It is an object of this invention, therefore, to provide a copolyester of polyethylene terephthalate and BSE having an increased crystallization time.

Another object of this invention is to provide such a copolyester which is capable of being molded into clear articles and which has an impact strength and resistance to thermally induced embrittlement at least comparable to articles prepared from PET homopolymers.

It is a further object of this invention to provide a process for preparing such copolyesters.

Other objects and advantages will become apparent from the following description and claims.

SUMMARY OF THE INVENTION

Broadly, this invention contemplates a copolyester of polyethylene terephthalate and BSE which can be molded into clear articles having an increased crystallization time and an instrinsic viscosity, glass transition temperature, resistance to thermally induced embrittlement, and impact strength comparable to polyethylene terephthalate.

The invention also contemplates a process for preparing the copolyester having an increased crystallization time comprising the steps of forming a polyethylene terephthalate prepolymer and polycondensing the prepolymer with from about 3 to about 5 mole percent of BSE in the presence of a suitable amount of a polycondensation catalyst system.

DETAILED DESCRIPTION

The polyethylene terephthalate prepolymer may be formed by either an ester interchange reaction or by a direct esterification reaction.

If the prepolymer is to be prepared by the direct esterification of ethylene glycol and terephthalic acid, isophthalic acid, or other derivatives, the reaction is conducted under a pressure of 1 or 2 atmospheres and at a temperature of from about 220° C. to about 260° C. During the esterification reaction, water is distilled off. The reaction is considered complete when no further water is distilled off or the amount of water distilled off is about 90% to about 95% of the theoretical yield. The direct esterification reaction may be conducted without a catalyst; however, a catalyst is often used to increase the speed of the reaction, minimize the diethylene glycol content of the prepolymer, and improve the color of the prepolymer. Esterification catalysts such as zinc acetate, calcium acetate, titanium ethoxide, manganous acetate, antimony oxalate, and the like are well known in the art, and this invention is not to be construed as being limited to any particular direct esterification catalyst or to any particular process conditions for the direct esterification reaction for forming a PET prepolymer.

If the prepolymer is prepared by an ester interchange reaction, the reaction takes place between ethylene glycol and dimethyl terephthalate. The reaction is generally conducted under atmospheric pressure and at a temperature of from about 160° C. to about 225° C. During this reaction, methyl alcohol is distilled off as a by-product. The ester interchange reaction is considered complete when, at the temperature of about 160° C. to about 220° C., no further methanol is removed or the amount of methanol distilled off is about 90% to 95% of the theoretical yield.

The number of moles of ethylene glycol used in the prepolymer reaction for each mole of dimethyl terephthalate or terephthalic acid ranges from about 1.8 to about 2.2 moles of ethylene glycol per mole of dimethyl terephthalate. Preferably, the molar ratio will be from about 2 to 1. If less than 1.8 moles of ethylene glycol is used for each mole of dimethyl terephthalate or terephthalic acid, then the reaction will not efficiently proceed to completion. If an amount in excess of 2.2 moles of ethylene glycol is used for each mole of dimethyl terephthalate or terephthalic acid, then the excess ethylene glycol may result in a faster reaction rate. However, the economic disadvantage of using excess ethylene glycol may offset the faster reaction rate.

The ester interchange reaction requires the use of a catalyst. The amount of catalyst may vary widely, but typically the catalyst contains from about 20 parts to about 200 parts of metal per million parts of dimethyl terephthalate. Among the catalysts which may be used for the ester interchange reaction are manganese acetate, lithium acetate, sodium methylate, magnesium acetate, cobalt acetate, calcium acetate, cobalt dichloride, manganse acetate tetrahydrate, and the like.

Following the formation of the prepolymer, the prepolymer is further polymerized by a polycondensation reaction. This polycondensation reaction is conducted at a temperature of from about 265° C. to about 300° C. and at a subatmospheric pressure of about 1 torr or less in the presence of a polycondensation catalyst.

I have unexpectedly found that the addition of bis (4-beta hydroxy ethoxy phenyl) sulfone (BSE) having the following chemical formula

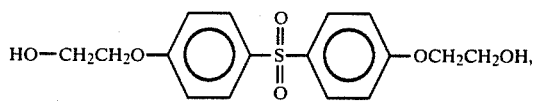

or ring substituted BSE compounds having the formula

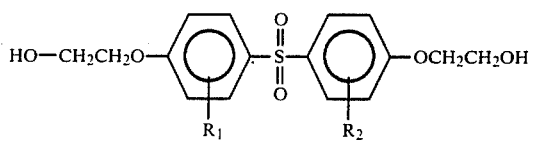

where $R_1$ and $R_2$ may independently be an alkyl group containing from 2 to 10 carbon atoms; or 2,4' derivatives of BSE having the following formula

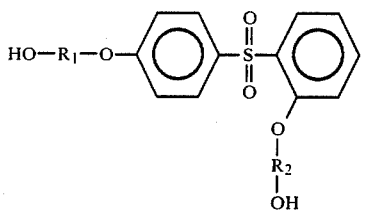

where $R_1$ and $R_2$ may independently be an alkyl group containing from 2 to 10 carbon atoms; and mixtures thereof, to the prepolymer during the polycondensation step, or preferably to the ester interchange reaction, results in a copolyester having dramatically increased crystallization time, good thermal and mechanical properties, resistance to thermally induced embrittlement, and good color (clarity) without adversely affecting the polycondensation reaction time.

I have found that the concentration of the BSE isomers and mixtures thereof which are useful to increase crystallization time and improve resistance to heat-induced embrittlement ranges from about 2 mole percent to about 5 mole percent of the copolyester. At about 5 mole percent, however, I have found that the crystallization time, measured on the basis of the time it takes for half of the copolyester to crystallize, becomes greater than 1000 seconds. In addition, as the concentration of the BSE in the copolyester decreases to 3 mole percent, the time in which crystallization occurs becomes reduced. Accordingly, I have found that the preferred concentration of BSE in the copolyester is from about 3 mole percent to about 5 mole percent for forming clear 0.2 inch-thick molded parts. This most preferred range of BSE concentration results in a crystallization time of about seven to about ten minutes.

The BSE may be added at the start of the ester interchange reaction, during the direct esterification reaction, or to the prepolymer during the polycondensation reaction. In each case, the composition of the final copolyester is the same.

The polycondensation reaction is carried out in the presence of a polycondensation catalyst system. This catalyst system is also preferably added after the prepolymer formation step is completed. If the polycondensation catalyst is added during the prepolymer formation step, then the desired rapid polycondensation reaction rate may not be obtained. Examples of useful polycondensation reaction catalysts include compounds containing titanium, antimony, tin, germanium, and the like.

Any titanic acid derivative may be used, such as alkyl titanates, for example, titanium tetraisobutoxide, tetra-isopropyl titanate, tetra-n-butyl-titanate, tetramethyl titanate, acetyl triisopropyl titanate, tetraisobutyl titanate, and the like. The preferred alkyl titanate is tetra-isopropyl titanate.

The concentration of the alkyl titanate catalyst must be above 2 parts per million titanium, based on the weight of titanium metal to the weight of final copolyester product. Below 2 parts titanium per million parts of polymer product, the polycondensation reaction rate is insufficient to yield a copolyester in a practical amount of time. When the concentration of the alkyl titanate catalyst is above 50 parts by weight titanium per million parts of polymer product, the color of the final copolyester becomes unsatisfactory.

The antimony compounds which are useful in the catalyst system are antimony trioxide, antimony glucoxide, antimony butoxide, acetyl antimony dibutoxide, and the like. The preferred antimony compound is antimony trioxide, and the preferred concentration is from about 40 to about 150 parts of antimony metal per million parts of polymer product.

The preferred catalyst system contains 100 parts antimony metal and 12 parts titanium metal. While it is possible to use the alkyl titanate separately, without the antimony compound, to catalyze the polycondensation reaction, the use of a catalyst containing both antimony and titanium metal improves the rate of the polycondensation reaction. It is also possible to catalyze the polycondensation reaction with the antimony compound separately, without the alkyl titanate, however, the crystallization time of the final product is not increased sufficiently and the final copolyester may have an unacceptable, greyish color. It is also possible to add the antimony compound during the prepolymer formation step; however, this is not preferable to its addition during the polycondensation reaction. The alkyl titanate catalyst must be added after the prepolymer reaction is completed.

A chain branching agent may also be present during the polycondensation reaction. This is often desirable to increase the melt viscosity of the copolyester. The chain branching agent may be present at any stage during the preparation of the copolyester. If a chain branching agent is present, the concentration of the chain branching agent is from about 0.1 mole percent to about 2 mole percent based on the number of moles of dimethyl terephthalate or terephthalic acid in the prepolymer formation step. Among the chain branching agents which may be used are pentaerythritol, dimethylol propionic acid, trimesic acid, and the like.

The polycondensation reaction is generally considered complete when the reaction product becomes sufficiently thick. This may be readily determined from the amount of power that is required to stir the reaction mixture.

Following the polycondensation reaction, the copolyester has an intrinsic viscosity as measured in tetrachloroethane/phenol on the order of about 0.6 dl/g. This is typically too low an intrinsic viscosity for the manufacture of molded articles, thicker than about ⅛". Molded articles, thicker than about ⅛", require an intrinsic viscosity on the order of about 0.7 to about 0.75 dl/g. PET homopolymer useful for molded articles typically has an intrinsic viscosity of 0.72 dl/g. In order to increase the intrinsic viscosity and molecular weight of the copolyester of this invention, it is preferable to further polymerize the copolyester. This is done in the solid phase by heating the copolyester to a temperature above the glass transition temperature of the copolyester but below its melting point. This solid phase polymerization is conducted at a temperature of from about 200° C. to about 235° C. while passing a stream of inert gas over the copolyester or while holding the copolyester under vacuum for a period of from about 8 to about 14 hours.

The resulting copolyester has an intrinsic viscosity of at least about 0.72 dl/g.

When preparing the copolyester, the starting materials may include other acid-derived comonomers beside dimethyl terephthalate and/or terephthalic acid so that the final product will have up to 2% of repeating units other than those derived from dimethyl terephthalate or terephthalic acid. Other acid-derived comonomers which may be present in an amount of up to 2% include isophthalic acid, bi-benzoic acid, naphthalene 1,4,- or 2,6-dicarboxylic acid, adipic acid, sebacic acid and esters thereof, and the like.

It should be understood that, when the polyethylene terephthalate prepolymer is prepared by an ester interchange reaction, any other acid-derived comonomers which are included are all esters, and when the direct esterification route is used, all such other acid-derived comonomers are acids.

One may also include other glycols besides ethylene glycol in an amount such that the final product will have up to about 4% of repeating units other than those derived from ethylene glycol. Among such other glycols may be neopentyl glycol, propylene glycol, butylene glycol, diethylene glycol, propane 1,3-diol, butane-1,4-diol, polytetramethylene glycol, 1,4-hydroxy methyl cyclohexane, and the like.

The copolyester may also include various additives such as antioxidant stabilizers, ultraviolet light screening agents, extrusion acids, dyes or pigments, mold release agents, and the like. Other suitable additives will be apparent to one skilled in the art. Whichever additive or additives are used, they must not adversely affect the copolyester when said copolyester is applied for its intended use.

In the examples which follow, the following test procedures were used.

Instrinsic viscosities are determined in a 60/40 phenol/symmetrical tetrachlorethane at 30° C.

Crystallization time is determined using a Perkin-Elmer DSC-II differential scanning calorimeter using the following procedure. Approximately 10 milligrams of dried copolyester is placed in the sample pan which is then placed in the calorimeter. The sample is heated to 573° K. and held at that temperature in order to melt the copolyester. After 120 seconds at 573° K., the sample is cooled at a rate of 160° K. per minute to a final temperature of 473° K. (200° C.). The exotherm is recorded and the crystallization time is taken as the time from the point that the recorder pen stabilizes on the base line to the time of maximum crystallization exotherm.

Penetration impact tests were run on a Dynatup Model 8200 tester (Effects Technology, Inc.). Specimens were prepared by injection molding 2"×3"×⅛" plaques. Heat-aged samples were held at 60° C. for 5 days. The type of failure (brittle or ductile) was determined by visual observation and by measuring the impact strength of the test sample.

In order to more fully illustrate the nature of this invention and the manner of practicing the same, the following examples are presented. In the Examples which follow, unless indicated to the contrary, all concentrations are shown as parts by weight.

GENERAL PROCEDURE

To a three-necked reaction vessel equipped with a stirrer, a condenser arranged for distillation, and a thermometer, is added 1000 parts of dimethyl terephthalate, 626 parts ethylene glycol, and BSE in the concentrations set forth in the following tables. Subsequently, 0.07 parts of manganese as manganese acetate (70 parts per million of final product), and 0.02 parts cobalt as cobalt acetate (20 parts per million of final product) are added to the reaction mixture. The reaction mixture is heated at a temperature of from 160° C. to 225° C. for a period of 97 minutes while removing 290 parts of methanol. Phosphorous acid (0.148 part) is then added as a stabilizer. The ester interchange prepolymer reaction is considered complete when 90 to 95% of the theoretical yield of methanol is removed or when no further methanol is removed. The polycondensation catalyst system is then added in the amounts set forth in the following table. The polycondensation catalyst system used is tetraisopropyl titanate and antimony trioxide. The pressure is reduced to less than 1 torr and the reaction temperature is increased to 280° C. to 290° C. to remove ethylene glycol by-product.

For comparison purposes, several examples are presented employing either alkyl titanate or an antimony compound separately as the polycondensation catalyst.

TABLE I

| Example | Polycond. Cat. (PC) Type | Conc.[1] | Copolymer Type | Conc.[2] | Crystall. Time (sec) DSC at 200° C. | Clarity 0.2 molded article | Glass Trans. Temp. (Tg) DSC, °C. | Intrin. Vis. (IV) dl/g | Penetration Impact Test As Molded | After 5 days, 60° C. |
|---|---|---|---|---|---|---|---|---|---|---|
| 1 | Sb/Ti | 100/10 | none | 0 | 60–80 | opaque | 82–84 | 0.72 | Ductile | Ductile |
| 2 | " | " | IPH[3] | 10 | 350–600 | clear | 75–80 | 0.62 | Ductile | Brittle |
| 3 | " | " | BSE | 3.0 | 630 | clear | 83–85 | 0.72 | Ductile | Ductile |

TABLE I-continued

| Example | Polycond. Cat. (PC) Type | Conc.[1] | Copolymer Type | Conc.[2] | Crystall. Time (sec) DSC at 200° C. | Clarity 0.2 molded article | Glass Trans. Temp. (Tg) DSC, °C. | Intrin. Vis. (IV) dl/g | Penetration Impact Test As Molded | After 5 days, 60° C. |
|---|---|---|---|---|---|---|---|---|---|---|
| 4 | " | " | NPG[4] | 10 | >500 | clear | 80-85 | 0.72 | Ductile | Brittle |

[1]Conc. = Concentration (parts metal per million parts final product)
[2]Conc. = Concentration (mole percent)
[3]IPH = isophthalate - Added as dimethyl isophthalate during prepolymer step
[4]NPG = Neopentylglycol added during prepolymer step Table I presents the results of a comparative test of polyethylene terephthalate homopolymer (Example 1) and three copolyesters. Example 1 (homopolymer) results in an opaque 0.2 inch molded article which is ductile and resistant to heat-induced embrittlement. The crystallization time, however, was only 60-80 seconds at 200° C. Example 2 was prepared using 10 mole percent isophthalate, added during the prepolymer step as dimethyl isophthalate. While an 0.2 inch thick molded article prepared from this copolyester had an increased crystallization time and was clear, it exhibited a reduced glass transition temperature as compared with homopolymer and was brittle upon exposure to temperature (60° C. for 5 days). Example 3 presents a copolyester of the present invention prepared with 3.0 mole percent BSE added at the beginning of the ester interchange step. Molded articles produced therefrom were optically acceptable, ductile, and resistant to heat-induced embrittlement. The copolyester had a Tg comparable with the homopolymer (Example 1) and exhibited an increased crystallization time of 630 seconds. Copolyesters prepared with greater than 3.0 mole percent and less than about 5.0 mole percent BSE isomers and mixtures thereof also have an increased crystallization time over PET homopolymer, and an intrinsic viscosity, Tg, impact strength and resistance to thermal-induced embrittlement at least equivalent to PET homopolymer. Example 4 was prepared by adding 10 mole percent of neopentylglycol to the prepolymer step. While this coglycol increased the crystallization time and resulted in clear molded articles, the penetration impact test showed that heat-induced embrittlement had occurred.

TABLE II

| Example | Polycondensation Catalyst (PC) Type | Conc.[1] | Polycondensation Copolymer Type | mole % | Crystall. Time (sec) at DSC[3] 200° C. | Clarity 0.2" Thick Molded Article |
|---|---|---|---|---|---|---|
| 5 | Sb | 240 | none | 0 | 30 | opaque |
| 6 | Sb | 240 | BSE | 2.5 | 70 | opaque |
| 7 | Sb/Ti | 100/12 | none | 0 | 60-65 | opaque |
| 8 | Sb/Ti | 100/12 | BSE | 2.0 | 140 | sl. haze |
| 9 | Sb/Ti | 100/12 | BSE | 3.0 | 430 | clear |
| 10 | Sb/Ti | 100/12 | BSE | 5.0 | * | clear |
| 11 | Ti | 12 | none | 0 | 120 | opaque |
| 12 | Ti | 12 | IPH[2] | 2.0 | 150 | opaque |
| 13 | Ti | 12 | BSE | 3.0 | 430 | clear |

[1]Conc. = Concentration (parts metal per million parts final product)
[2]IPH = Isophthalate
[3]Crystallization time was determined at an IV of 0.62 dl/g.
*Greater than 1000 seconds Table II (Examples 5-13) presents a comparison of the copolyesters of this invention prepared with varying concentrations of catalysts and copolymers. Examples 5 and 6 show that, when antimony (240 ppm) catalyst alone is used, the crystallization time of a copolyester prepared using 2.5 mole % BSE results in only a slight increase in crystallization time but results in an opaque molded article. Examples 7-10 were prepared with the preferred combined Sb/Ti catalyst (100/12) system and with various concentrations of BSE. These examples show that, as the concentration of BSE increases, the crystallization time also increases. At 5.0 mole % BSE concentration, the crystallization time becomes too long to be measured (greater than 1000 seconds). Examples 11-13 present the results of copolyesters prepared using a titanium-containing catalyst only. The copolyester of Example 13 (3.0 mole % BSE) showed a crystallization time equal to that achieved in Example 9 using the same concentration of BSE with a combined Sb/Ti catalyst system.

What is claimed is:

1. A process for preparing a copolyester of polyethylene terephthalate comprising:
   (1) preparing a polyethylene terephthalate prepolymer by the ester interchange reaction of ethylene glycol, dimethyl terephthalate, and from 3 mole percent to about 5 mole percent bis (4-beta hydroxy ethoxy phenyl) sulfone, isomers thereof, and mixtures of bis (4-beta hydroxy ethoxy phenyl) sulfone and isomers thereof:
   (2) polycondensing said prepolymer in the presence of a metalcontaining catalyst, said metal being selected from the group consisting of titanium, antimony, tin, germanium and mixtures thereof, and when the catalyst comprises antimony, the concentration of said antimony metal is from about 40 to about 150 parts per million based on the weight of said copolyester, such that the crystallization time of said copolyester is increased from about 7 to about ten minutes.

2. The process of claim 1 further comprising polymerizing the polycondensed copolyester in the solid phase at a temperature above the glass transition temperature of the copolyester and below its melting point until said copolyester has an intrinsic viscosity of at least 0.72 dl/g.

3. The process of claim 1 further comprising molding the polycondensed copolyester into a clear article.

4. The process of claim 2 further comprising molding the solid phase polymerized copolyester into a clear article having a thickness of at least 0.2 inches.

5. The copolyester prepared according to claim 1.

6. The copolyester prepared according to claim 2.

7. The clear article prepared according to claim 3.

8. The clear article prepared according to claim 4.

9. The process of claim 1 wherein said catalyst comprises 12 parts per million titanium metal based on the weight of said copolyester.

* * * * *